Oct. 29, 1940.     K. L. CHILDS     2,219,949
FRYING APPARATUS
Filed March 9, 1937
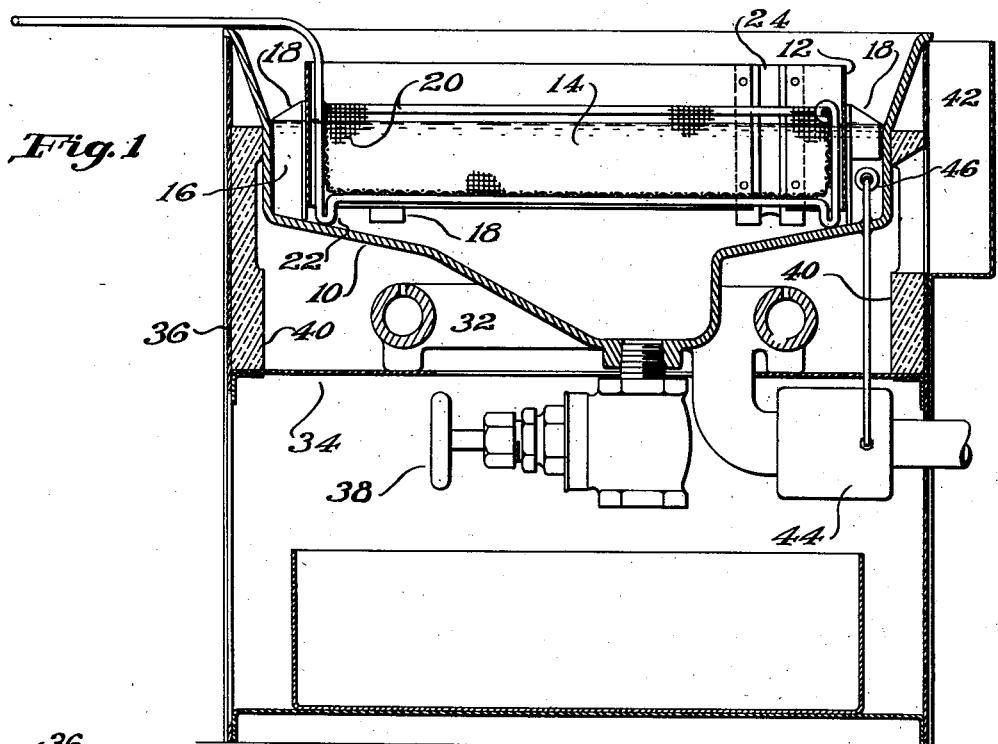
Fig. 1
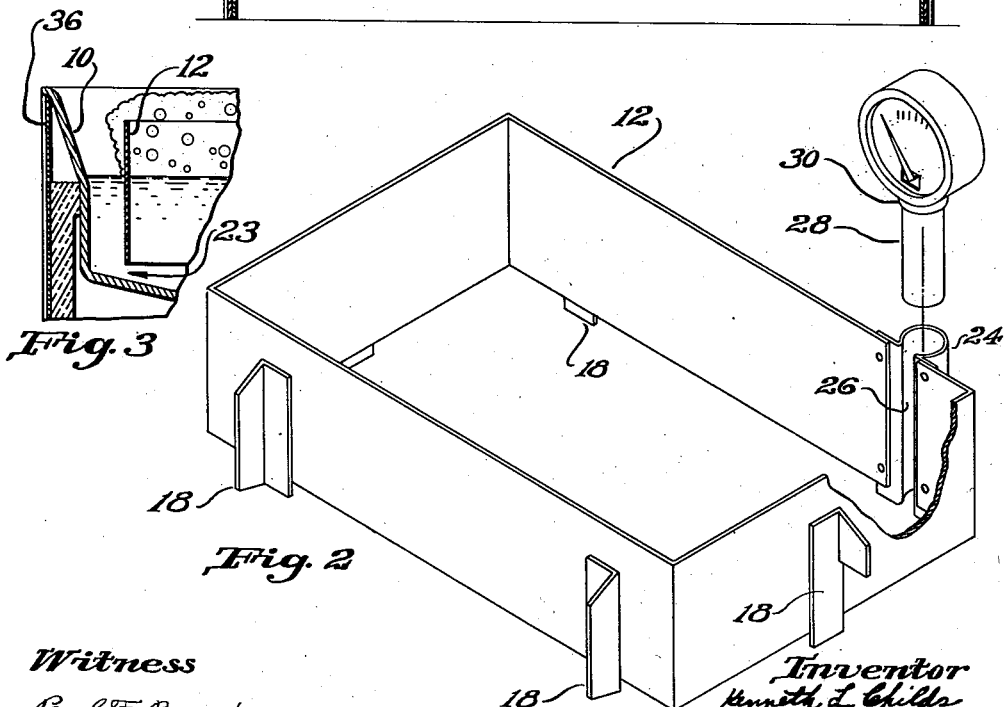
Fig. 3
Fig. 2
Witness
Paul F. Bryant
Inventor
Kenneth L. Childs
by Erich Hildreth
Cary & Jenney Attys Patented Oct. 29, 1940

2,219,949

UNITED STATES PATENT OFFICE 2,219,949

FRYING APPARATUS

Kenneth L. Childs, New Haven, Conn.

Application March 9, 1937, Serial No. 129,860

6 Claims. (Cl. 53—7)

The present invention relates to frying apparatus and more particularly to improvements in kettles or other containers for holding a supply of highly heated fat or oil while treating foods or other articles from which water vapor may be driven off.

Heretofore, at the upper part of a frying kettle in which foods to be treated are immersed there has been provided a horizontally extending flange or shelf portion draining into the kettle to take care of overflow while the excess of water from the surfaces of the foods is being evaporated. Due to the likelihood of fire, the necessity for taking care of overflow is particularly important where a shallow kettle or pan containing a quantity of fat or oil is heated by open combustion, such as with a gas flame. To provide a flange or shelf in a small sized kettle large enough to be effective in taking care of overflow requires the addition of undesirable bulk to the kettle, the space taken up being excessive as compared to the useful volume of the kettle and the safe height required in the side walls of the kettle above the surface of the fat, introducing a difficulty in handling the food. Furthermore, where a flange or shelf is formed integrally with the side walls of a small uninsulated kettle to provide overflow space, the horizontal surface of the flange may become highly heated so that it will be quickly encrusted with a mixture of burned fat and food, thus flavoring undesirably the entire batch of fat contained in the kettle.

The object of the present invention is to provide frying apparatus having a kettle of relatively small internal capacity as compared to previous frying kettles in which the difficulties above enumerated will be avoided. Another object of the invention is to provide simple and effective means for rendering kettles or pans already in existence which are designed only for use in browning or souffléing, capable of safe and effective use in immersion frying without any permanent change in the mechancial construction of the kettles. A further object relates to the provision of reliable means for removably supporting a thermometer in connection with any open frying kettle or pan without changing the construction of the kettle or decreasing the ease with which it may be cleansed after use.

With these and other objects in view, the present invention contemplates the provision in immersion frying apparatus including a frying kettle or pan, of a foam controlling rim projecting above the level of the fat within the kettle so arranged as to cause overflow of the foam into a channel formed by the rim, the rim being so spaced from the side of the kettle as to readily contain and cause to be broken up along a surface of undisturbed clear fat all the foam overflowing into the channel when the maximum possible amount of food is being fried. As herein illustrated, the upper edge of the rim is below the level of the upper edge of the kettle so that the foam from the frying zone will reach the upper edge of the kettle with greater difficulty, and the slight spray caused by disintegrating foam will not be directed outside the kettle. A further feature of the invention relates to means on the foam rim for supporting a thermometer. In the form of this feature, as hereinafter described, the thermometer supporting means consists of a sleeve between which and the inner frying zone of the rim there is a circulating passage for the heated fat so that the thermometer registers a composite of two temperatures, namely, that in the frying zone and that in the channel.

While the features of the invention are illustrated in connection with a complete frying apparatus including a heating element with the kettle, certain features are of more general application and are useful in connection with more readily portable frying kettles or pans adapted to be heated on a stove top. Other features of the invention including certain details of construction and combinations of parts are hereinafter described in the following detailed specification, and more particularly pointed out in the appended claims.

In the drawing Figure 1 is a side view taken in vertical section of an apparatus embodying the features of the present invention; Figure 2 is a perspective view of the foam controlling rim of the invention and a thermometer in separated relation to show the construction of the supporting means for the thermometer; and Figure 3 is a view in section illustrating the action of the rim in separating the foam and clear fat.

The apparatus illustrated in the drawing is a relatively small complete unit having a fat containing kettle for frying small portions or single orders of food arranged in a single layer by means of a substantial depth of clear fat or oil raised to a moderately high temperature. During operation the food is immersed beneath the surface of the fat in a manner commonly termed "deep fat frying." Most articles of food so prepared contain a large percentage of water, and when immersed in the fat, some of the surface water is quickly driven off as steam, being entrapped within bubbles formed by the fat. At the high temperatures used in present day frying, the surface tension of the heated fat is so small that the steam bubbles are relatively minute and break quickly after coming into contact with the air, so that the danger of overflow occurs only when the foam is being formed rapidly as the food is first immersed in the kettle. With an ordinary shallow frying kettle, the mass of bubbles will continue to rise unless allowed to spread out until the upper edges of the kettle are reached, and when the bubbles break, the fat forming the bubbles will run down the outer surfaces of the kettle with the danger of becoming ignited by the heating apparatus beneath the kettle. The loss of fat from this cause, while using an ordinary shallow kettle, also will be excessive unless special provision is made to prevent it, so that the cost of the fat is out of proportion to the value of the food prepared. To prevent the fat from being wasted and to reduce the hazard of fire, the kettle illustrated is provided with a vertical foam controlling rim for separating the foam rising from the food being fried so that a substantial proportion can be dissipated by spreading out before reaching the outer edge of the kettle, the foam which reaches the side of the kettle being projected with sufficient speed, either from sudden contact with the heated clear fat in the channel, or otherwise, to disintegrate it along the side of the kettle where it will be broken down by impact. Within the rim is the zone of fat ordinarily employed for frying where the temperature is highest. The rim is so proportioned that between the rim and the side of the kettle is provided a channel of relatively undisturbed fat of sufficient width to disintegrate all the foam overflowing the rim when the frying zone is completely filled with food.

Referring more particularly to the drawing, the kettle indicated at 10 is of single piece drawn construction and the foam controlling rim 12 is removably supported within the kettle with its vertical walls parallel to the sides of the kettle to form an inner frying zone 14 and an outer undisturbed channel 16 of substantially uniform width for the fat. The rim is constructed of an unperforated strip of sheet metal bent into a shape similar to, but smaller than, the inside of the kettle, the kettle being filled with a substantial volume of clear fat so that the central portion of the kettle in the frying zone 14, directly below the level of the fat will be sufficiently large to accommodate a single layer of food, such as cubed potatoes or scallops. The upper edge of the rim is located at some distance below the level of the edges of the kettle to prevent the slight mist formed by the breaking foam from escaping down the outer surfaces of the kettle. To locate the rim removably within the central frying zone of the kettle with the upper edge of the rim projecting a suitable distance above the surface of the clear fat, a series of angular spacing legs 18 are provided at proper locations along the rim and the outstanding flanges of the legs engage the sides of the kettle. The space provided between the rim and the sides of the kettle is sufficient in width to collect and disintegrate all of the foam flowing over the top of the rim 12 for the largest supply of food which may be introduced into the frying zone of the kettle, the amount of foam produced in frying being substantially proportional to the quantity of food prepared. To hold the food while frying there is provided a food receiving basket 20 of relatively large area as compared to the usual construction, but somewhat more shallow than is ordinarily used with previous cooking apparatus of this type. The basket is constructed with a suitable frame and wire mesh held within the frame, the size being such that when disposed within the cooking zone of the kettle, the basket may be immersed substantially to its upper edge. The frame of the basket is provided with short legs 22 which support the basket out of contact with the heated kettle bottom.

When the apparatus is in operation with the foam controlling rim 12 in place, the rising bubbles of entrapped steam forming the foam will substantially fill the space within the rim 12 above the level of the fat. However, just as the bubbles of steam begin spreading out across the upper edge of the shield and run down into contact with the highly heated fat in the channel, as indicated in Figure 3, they collapse, either from sudden contact with the cooler air or from being projected across the surface of the heated fat, releasing the steam and clearing the fat from which the bubbles were composed. The cleared fat then running into the undisturbed channel 16 of heated fat displaces the heated fat through an opening 23 beneath the rim and causes it to flow into the frying zone. In this way the foam is never permitted to reach the upper edge of the kettle so as to wet and run down the outer surfaces of the kettle. The rim also keeps the cooled portions of the fat flowing into the channel separate from the frying zone. To form the opening 23 through which the previously heated fat may move into the frying zone, when displaced by fat running over the rim 12, the legs 18 extend sufficiently below the lower edge of the rim 12 to support the rim out of contact with the kettle bottom.

In order that the composite temperature of the heated fat both in the frying zone and in the channel may be observed without inconvenience, the ends of the metal strip which forms the foam rim 12 are joined together by the ends of a circular metal thermometer receiver sleeve 24 having oppositely directed flanged portions riveted to the adjacent ends of the strip. The flange portions of the sleeve 24 are suitably spaced to provide a passage 26 between them by means of which communication is had from the inside of the sleeve to the frying zone 14 within the rim 12. The sleeve 24 is of proper diameter to receive the temperature responsive portion of a thermometer 28 of well known construction so that the dial of the thermometer will project above the surface of the fat in position to be readily visible. To prevent the temperature responsive portion of the thermometer from contacting with the heated bottom of the kettle, the thermometer is provided with an enlarged ring 30 arranged to engage the upper edge of the sleeve 24. The size of the sleeve 24 is such that it not only supports the thermometer but also serves in place of one of the legs 16 to maintain the shield 12 in a central location in the kettle.

The means for heating the kettle 10 comprises a rectangular hollow gas burner 32 resting on a shelf-like partition 34 secured in a kettle supporting frame 36 beneath the kettle. The burner 32 directs a ring of flame against the bottom of the kettle at a suitable distance from the kettle sides and the kettle is formed with a downwardly projecting sediment well within the hollow of the burner, the outlet of which well is opened or closed with a suitable hand operated valve 38. Surrounding the kettle is a layer of insulating material 40 and the upper part of the kettle is flared slightly to provide space for the insulating material between the lower kettle sides and the supporting frame 36. A vent 42 for the burned gases is provided at the rear of the apparatus. To maintain a uniform temperature in the kettle a thermostat controlled valve 44 of well known type is disposed in the gas line from which the burner 32 is fed, a control bulb 46 therefor being located at the rear of the kettle within the channel between the rim 12 and the kettle side.

By arranging a relatively shallow kettle in the manner described, the rim not only prevents escape of the foam from the kettle, while frying, but due to the relatively undisturbed volume of heated fat in the channel 16 surrounding the frying zone 14, the fat in the frying zone will be more quickly restored to the desired temperature after frying a batch of food than with a kettle in which the entire capacity of fat is subjected to the direct cooling effect of the immersed food.

The invention having been specifically described, what is claimed is:

1. Frying apparatus having, in combination, an open kettle arranged with a heated bottom to provide a frying zone containing highly heated fat or oil within a substantial proportion of its inner volume, a foam controlling rim in the kettle arranged with its upper edge acting to separate a substantial proportion of foam from the clear fat during normal frying operations, and means engaging the bottom of the kettle for spacing the rim from the side of the kettle a sufficient distance to contain in the channel thus formed the entire quantity of foam overflowing the rim when the frying zone of the kettle is filled with food, and for supporting the rim above the bottom of the kettle to provide an opening through which heated fat will be displaced from the channel formed by the rim.

2. Frying apparatus having, in combination, a relatively shallow open kettle heated along its bottom surface and arranged to provide a frying zone containing highly heated fat or oil extending from the heated bottom to the upper surface of the fat or oil contained in the kettle, and a foam controlling rim in the kettle having its upper edge located substantially below the level to which the foam rises during normal frying operations and forming, with the side and bottom of the kettle, a channel of heated fat into which foam overflowing the rim may become broken up by being projected from the rim along a clear undisturbed surface of heated fat within the channel at least as rapidly as the overflow takes place.

3. Frying apparatus having, in combination, an open kettle and a foam controlling rim mounted within the kettle having its upper edge spaced a substantially uniform distance horizontally from the kettle side and below the level at which foam rises during normal frying operations for separating the kettle into a central frying zone and a channel of clear heated fat between the frying zone and the side of the kettle of sufficient width to cause foam passing over the upper edge of the rim to be projected by contact with heated fat in the channel and to be broken up along the surface of the fat in the channel.

4. Frying apparatus having, in combination, a relatively shallow open kettle arranged to provide a frying zone containing highly heated fat or oil within a substantial proportion of its inner volume, a foam controlling rim in the kettle arranged with its upper edge below the level of the outer edge of the kettle acting as a separator for the foam and clear fat during normal frying operations, and means for spacing the rim from the side of the kettle a sufficient distance to cause substantial dissipation of foam by projection along a surface of clear heated fat in the channel thus formed when food is introduced into the frying zone of the kettle.

5. Frying apparatus having, in combination, a relatively shallow open kettle arranged to provide a frying zone containing highly heated fat or oil within a substantial proportion of its inner volume, a foam controlling rim spaced from the side of the kettle and arranged with its upper edge below the level to which foam rises during normal frying operations acting to separate and to cause dissipation by projection of the foam along the surface of the fat in the channel between the rim and the side of the kettle during normal frying operations, and a thermometer supporting receiver between the rim and the side of the kettle arranged with a circulating passage between the frying zone of the kettle and the inside of the sleeve.

6. Frying apparatus having, in combination, a relatively shallow open kettle arranged to provide a frying zone containing highly heated fat or oil within a substantial proportion of its inner volume, a foam controlling rim spaced from the side of the kettle and arranged with its upper edge below the level to which foam rises during normal frying operations acting to separate and to cause dissipation by spreading out of a substantial proportion of foam along the surface of the fat in the channel between the rim and the side of the kettle, and means including a thermometer supporting sleeve for spacing the rim from the side of the kettle.

KENNETH L. CHILDS.